G. H. WATERS.
NON-CLOGGING CORN HARVESTER KNIFE.
APPLICATION FILED DEC. 20, 1917.

1,276,295.

Patented Aug. 20, 1918.
2 SHEETS—SHEET 1.

Inventor
George H. Waters,
By Franklin H. Hough
Attorneys

Witnesses

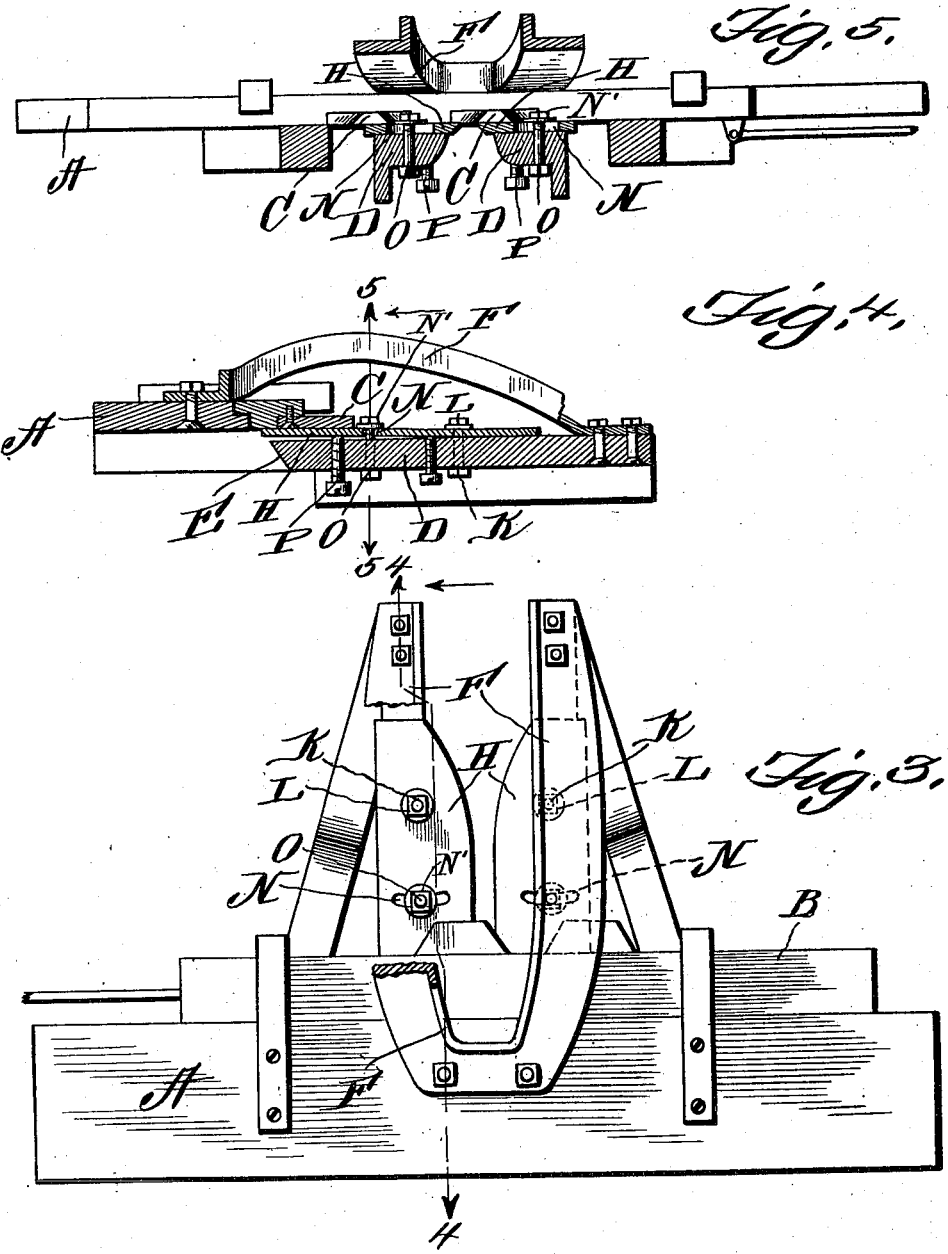

UNITED STATES PATENT OFFICE.

GEORGE H. WATERS, OF GLENFIELD, NEW YORK.

NON-CLOGGING CORN-HARVESTER KNIFE.

1,276,295.	Specification of Letters Patent.	Patented Aug. 20, 1918.

Application filed December 20, 1917. Serial No. 208,126.

*To all whom it may concern:*

Be it known that GEORGE H. WATERS, a citizen of the United States, residing at Glenfield, in the county of Lewis and State of New York, has invented certain new and useful Improvements in Non-Clogging Corn-Harvester Knives; and he does hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in a device for preventing grass clogging the knives of corn harvesters. Heretofore trouble has frequently been encountered in harvesting corn by grass getting in between the knives of the reciprocating sicklebar and the ledger plates, causing the knives to be clogged.

The present invention consists in the provision of means for avoiding this trouble and comprises ledger plates which may be adjustably held by set screws, so that their upper faces may be held in close proximity to the under surfaces of the knives of the sicklebar, and in the provision of cut-away portions at the inner ends of the plates and supporting bars to permit grass to make exit without clogging.

The invention consists of further various details of construction, combinations and arrangements of parts which will be hereinafter fully described, shown in the accompanying drawings and then specifically defined in the appended claims.

I illustrate my invention in the accompanying drawings which, with the letters of reference marked thereon, form a part of this specification and in which:

Fig. 3 is a top plan view.

Fig. 4 is a sectional view on line 4—4 of Fig. 3, looking in the direction of the arrow, and Fig. 5 is a sectional view on line 5—5 of Fig. 4 looking in the direction of the arrow.

Figure 1:
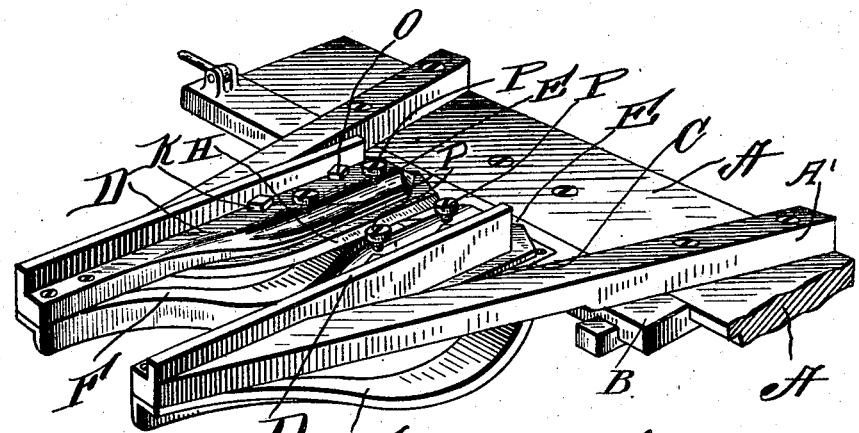
Figure 1 is a perspective view of the under side of my invention.

Reference now being had to the details of the drawings by letter:

A designates a portion of the frame of a corn harvester and B is a sickle bar adapted to reciprocate and contact with the edge of the frame, said sickle bar being provided with suitable knives C. Secured to said frame A and projecting at angles to each other are the bars A' which support the angled bars D, the forward ends of which are tapering, as shown, and F is a brace member substantially U-shaped with its opposite edges bowed and fastened by bolting or otherwise to the upper face of the frame A, while its ends are secured to the outer ends of the bars A'.

Said U-shaped bar F is preferably flanged along its inner edge, in order to add strength to the same and being upwardly bowed to permit access to be had conveniently for the adjustment of the ledger plates beneath. The ledger plates are designated in the drawings by letter H, and have their adjacent edges curved, as shown, and are secured to the bars D through the medium of the bolts K which pass through registering holes in the latter and said plates, and upon which bolts nuts L are mounted. Each plate H has a transverse slot N formed therein, and near their inner ends bolts O pass through threaded apertures in the bars D and said slots N and have nuts N' thereon. Said slots N are provided for the purpose of permitting the ledger plates to be adjusted laterally, and set screws P are mounted in threaded apertures in the bars D, and their upper ends are adapted to bear against the under faces of the ledger plates K, as shown clearly in Fig. 4 of the drawings, thus affording means whereby the ledger plates and blades of the sickle bar may have relative adjustments. This adjusting feature of the ledger plates is of importance, as it affords means for avoiding grass or other foreign matter lodged between the blades of the sickle bar and said plates, and which is a common trouble with the usual corn harvester now constructed.

Figure 2:
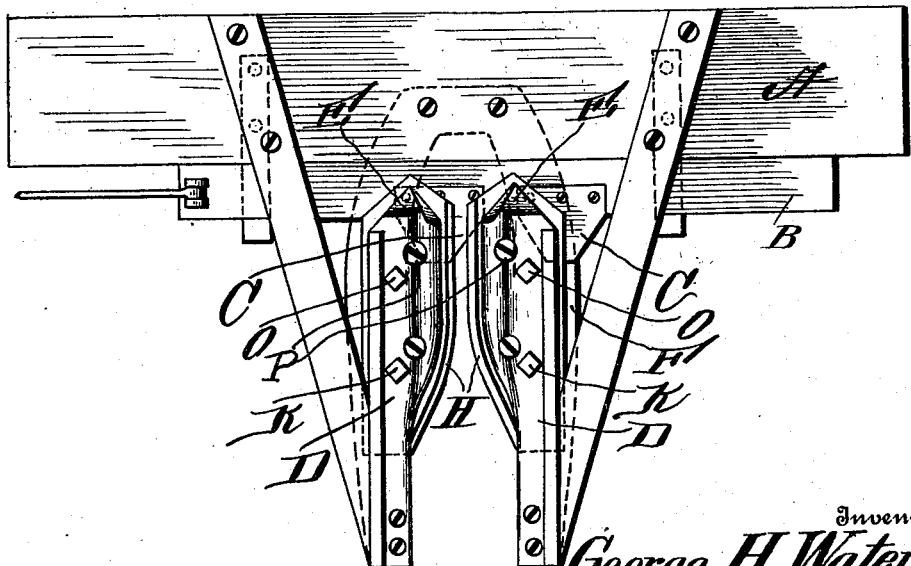
Fig. 2 is a bottom plan view.

Upon reference to Fig. 2 of the drawings it will be noted that the inner ends of the plates H are beveled or pointed, as are also the inner ends of the bars D, these being so shaped for the purpose of preventing any grass that may be bent over by the harvester from passing between the inner ends of the plates and the sickle bar.

By the provision of a device embodying the features of my invention, it will be noted that a simple and efficient mechanism is provided whereby the reciprocating sickle bar and harvester may be kept comparatively clear of clogging from grass, weeds or other foreign matter.

What I claim to be new is:

1. A device for preventing grass or other foreign matter from clogging the reciprocating sickle bars of corn harvesters comprising in combination with the frame of a harvester, a reciprocating sickle bar with cutting blades thereon, a U-shaped brace member secured to said frame, bars secured to the frame and projecting therefrom at angles to each other, brace angle bars secured to the under surface of said U-shaped member and spaced apart, the angle bars having their outer portions tapering, ledger plates bolted to said angled bars and having lateral adjustment, and set screws mounted in threaded apertures of the angled bars and bearing against the under surfaces of said plates, the inner ends of the angled bars and ledger plates terminating intermediate the opposite longitudinal edges of the sickle bar.

2. A device for preventing grass or other foreign matter from clogging the reciprocating sickle bars of corn harvesters, comprising in combination with the frame of a harvester, a reciprocating sickle bar with cutting blades thereon, a U-shaped brace member secured to said frame, bars secured to the frame and projecting therefrom at angles to each other, brace angle bars secured to the under surface of said U-shaped member and spaced apart, the angle bars having their outer portions tapering, ledger plates bolted to said angled bars and having lateral adjustment, and set screws mounted in threaded apertures of the angle bars and bearing against the under surfaces of said plates, the inner ends of the ledger plates and angle bars being beveled and terminating intermediate the opposite edges of the sickle bar.

In testimony whereof I hereunto affix my signature in presence of two witnesses.

GEORGE H. WATERS.

Witnesses:
FRANKLIN H. HOUGH,
A. L. HOUGH.

Copies of this patent may be obtained for five cents each, by addressing the "Commissioner of Patents, Washington, D. C."